(12) United States Patent
Yokoyama et al.

(10) Patent No.: US 11,603,080 B2
(45) Date of Patent: Mar. 14, 2023

(54) BRAKE DEVICE AND VEHICLE CONTROL DEVICE

(71) Applicant: HITACHI AUTOMOTIVE SYSTEMS, LTD., Hitachinaka (JP)

(72) Inventors: Wataru Yokoyama, Yokohama (JP); Tatsuji Okubo, Maebashi (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 126 days.

(21) Appl. No.: 16/648,001

(22) PCT Filed: Sep. 19, 2018

(86) PCT No.: PCT/JP2018/034614
§ 371 (c)(1),
(2) Date: Mar. 17, 2020

(87) PCT Pub. No.: WO2019/065399
PCT Pub. Date: Apr. 4, 2019

(65) Prior Publication Data
US 2020/0262399 A1    Aug. 20, 2020

(30) Foreign Application Priority Data
Sep. 27, 2017    (JP) .............................. JP2017-185737

(51) Int. Cl.
*B60T 8/18*    (2006.01)
*B60T 8/171*    (2006.01)
(Continued)

(52) U.S. Cl.
CPC ............ *B60T 8/171* (2013.01); *B60T 8/1837* (2013.01); *B60T 13/58* (2013.01); *B60T 13/74* (2013.01)

(58) Field of Classification Search
CPC . B60T 8/17; B60T 8/18; B60T 8/1837; B60T 8/171; B60T 8/58; B60T 13/74
See application file for complete search history.

(56) References Cited

U.S. PATENT DOCUMENTS 4,848,852 A * 7/1989 Inoue .................... B60T 13/686
188/106 P
2004/0008119 A1  1/2004 Sakai et al.
(Continued)

FOREIGN PATENT DOCUMENTS

| JP | 04-185560 | 7/1992 |
|----|-----------|--------|
| JP | 5-50914 | 3/1993 |

(Continued)

OTHER PUBLICATIONS

Machine translation of KR 20120053212 (no date).*
(Continued)

*Primary Examiner* — Nicholas J Lane
(74) *Attorney, Agent, or Firm* — Wenderoth, Lind & Ponack, L.L.P.

(57) ABSTRACT

Provided is a brake device capable of stabilizing a deceleration at the time of starting braking. The brake device is configured to correct a distribution of a braking force to each wheel or a braking force for each wheel, based on a detection value obtained by a load position distribution detection unit configured to detect a position distribution of a load applied to the vehicle when the vehicle is stopped or is in an initial period of starting.

5 Claims, 7 Drawing Sheets

(51) Int. Cl.
 B60T 13/58 (2006.01)
 B60T 13/74 (2006.01)

(56) References Cited

U.S. PATENT DOCUMENTS

| | | | | |
|---|---|---|---|---|
| 2005/0167959 | A1* | 8/2005 | Speckhart | B60N 2/002 280/735 |
| 2006/0108154 | A1* | 5/2006 | Mack | G01G 19/08 177/136 |
| 2007/0135983 | A1 | 6/2007 | McDonald et al. | |
| 2008/0255744 | A1* | 10/2008 | Yasui | B60T 8/1766 701/70 |
| 2017/0355356 | A1 | 12/2017 | Okada et al. | |
| 2018/0154875 | A1* | 6/2018 | Takahashi | B60T 13/146 |
| 2018/0304774 | A1 | 10/2018 | Mizoi | |

FOREIGN PATENT DOCUMENTS

| | | | | |
|---|---|---|---|---|
| JP | 9-301149 | | 11/1997 | |
| JP | 4007070 | | 11/2007 | |
| JP | 2009-519465 | | 5/2009 | |
| JP | 2017-081194 | | 5/2017 | |
| JP | 2017-105224 | | 6/2017 | |
| KR | 20120053212 A | * | 5/2012 | B60T 8/172 |
| KR | 10-2017-0102871 | | 9/2017 | |

OTHER PUBLICATIONS

Written Opinion dated Nov. 27, 2018 in corresponding International (PCT) Application No. PCT/JP2018/034614; with English Translation.

International Search Report dated Nov. 27, 2018 in corresponding International (PCT) Application No. PCT/JP2018/034614; with English Translation.

Notice of Reasons for Refusal dated Feb. 9, 2021 in corresponding Japanese Patent Application No. 2019-545000, with English-language translation.

Notification of Reason for Refusal dated Mar. 10, 2021 in corresponding Korean Patent Application No. 10-2020-7007366, with Machine Translation.

Notice of Reasons for Refusal dated Nov. 17, 2020 in corresponding Japanese Patent Application No. 2019-545000, with English Translation.

* cited by examiner

Fig. 6

| VEHICLE OCCUPANT POSITION | 1 | 1 | 2 | 2 | 2 | 2 | 3 | 3 | 3 | 3 | 3 | 3 | 4 | 4 | 4 | 4 | 4 | 5 |
|---|---|---|---|---|---|---|---|---|---|---|---|---|---|---|---|---|---|---|
| DRIVER'S SEAT | O |   | O | O | O | O | O | O | O | O | O | O | O | O | O | O | O | O |
| FRONT PASSENGER'S SEAT |   | O | O |   |   |   | O | O | O |   |   |   | O | O | O | O |   | O |
| REAR RIGHT SEAT |   |   |   | O |   |   |   |   | O | O | O |   | O | O |   | O |   | O |
| REAR CENTER SEAT |   |   |   |   | O |   |   | O |   | O |   | O | O |   | O | O | O | O |
| REAR LEFT SEAT |   |   |   |   |   | O | O |   |   |   | O | O |   | O | O |   | O | O |

NUMBER OF VEHICLE OCCUPANTS

Fig. 7

|  | ONE PERSON ON DRIVER'S SEAT |
|---|---|
| FRONT WHEEL INCREASED MASS | 36 |
| RIGHT FRONT WHEEL DISTRIBUTION RATIO | 50.7 |
| RIGHT REAR WHEEL DISTRIBUTION RATIO | 50.4 |

BRAKE DEVICE AND VEHICLE CONTROL DEVICE

TECHNICAL FIELD

The present invention relates to a brake device configured to apply a braking force to a vehicle, for example, an automobile.

BACKGROUND ART

Hitherto, there has been known a brake device including a front wheel brake mechanism and a rear wheel brake mechanism. In Patent Literature 1, as a method of allowing braking forces for front and rear wheels to approach an ideal braking force distribution line, there is described a brake device configured to adjust a hydraulic pressure for the rear wheels so that wheel slip ratios or wheel speeds are the same between the front wheels and the rear wheels.

CITATION LIST

Patent Literature

PTL 1: JP 09-301149 A

SUMMARY OF INVENTION

Technical Problem

The brake device described in Patent Literature 1 calculates or sets, in advance, the ideal braking force distribution line under a vehicle light load state (there is one vehicle occupant) or under a vehicle empty state, determines a target deceleration in accordance with an operation of a driver, and outputs braking force commands to the front wheels and the rear wheels in accordance with the ideal braking force distribution line. Therefore, when a vehicle weight increases due to an increase in the number of vehicle occupants, the target deceleration cannot be reached with the braking commands to the front wheels and the rear wheels based on the ideal braking force distribution line, and the braking forces are thus corrected by feeding back a slip ratio during the braking.

However, the deceleration at the time of starting the braking may become unstable due to the correction made during the braking.

Solution to Problem

A brake device according to one embodiment of the present invention is configured to correct a distribution of a braking force to each wheel or a braking force for each wheel, based on a detection value obtained by a load position distribution detection unit configured to detect a position distribution of a load applied to the vehicle when the vehicle is stopped or is in an initial period of starting.

Therefore, the ideal braking force distribution line can be corrected before the first braking state after the start of the travel, and the deceleration at the time of start of the braking can thus be stabilized.

BRIEF DESCRIPTION OF DRAWINGS

FIG. 6 is a table for showing vehicle occupant position patterns of a five-vehicle occupant vehicle in the first embodiment.

FIG. 7 is a table for showing an example of set values in the first embodiment.

DESCRIPTION OF EMBODIMENTS

A description is given below of embodiments of the present invention with reference to the drawings.

First Embodiment

Figure 1:
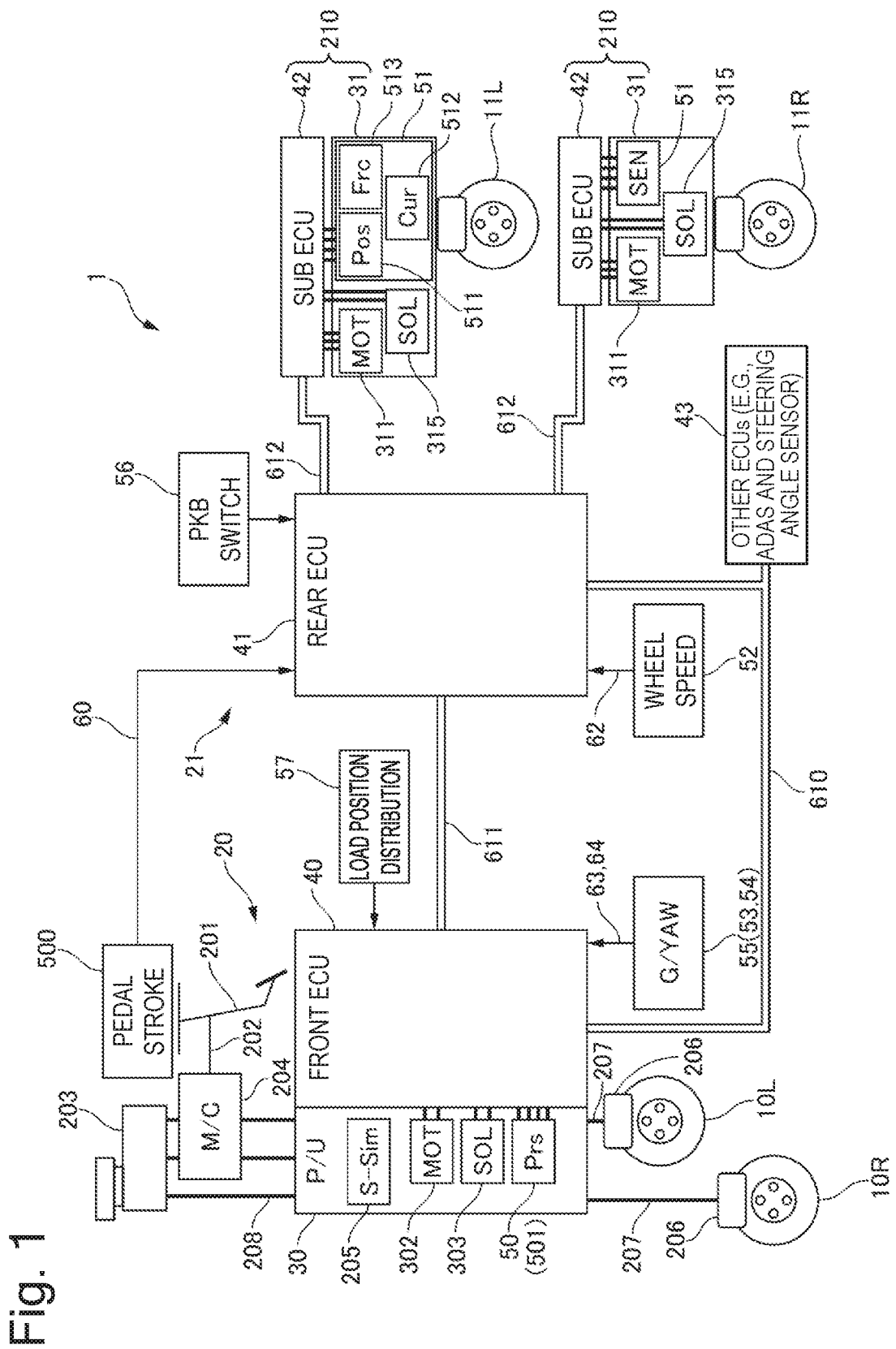
FIG. 1 is diagram for illustrating a configuration of an entire brake system in a first embodiment of the present invention.

First, referring to FIG. 1, a description is given of an overall configuration of a brake system 1 for a vehicle in this embodiment. The brake system 1 can be applied to vehicles such as an engine vehicle, a hybrid vehicle, and an electric vehicle. The vehicle includes a plurality of (four) wheels. Front wheels 10 belonging to a first group out of the plurality of wheels include a left front wheel 10L and a right front wheel 10R. Rear wheels 11 belonging to a second group different from the first group out of the plurality of wheels include a left rear wheel 11L and a right rear wheel 11R. The brake system 1 includes a brake device 20 (front wheel brake device) on a side of the front wheels 10 and a brake device 21 (rear wheel brake device) on a side of the rear wheels 11.

First, a description is given of the front wheel brake device 20. The front wheel brake device 20 includes a brake pedal 201, an input rod 202, a reservoir tank 203, a master cylinder 204, a hydraulic brake mechanism 30, a stroke simulator 205, a front ECU 40, and a stroke sensor 500. The brake pedal 201 is a brake operation member to which a brake operation of a driver of the vehicle is to be input. The brake pedal 201 is connected to the master cylinder 204 through the input rod 202. The stroke sensor 500 is configured to detect a rotational angle of the brake pedal 201. This rotational angle corresponds to a stroke (pedal stroke) of the brake pedal 201. The pedal stroke corresponds to an operation amount (brake operation amount) of the brake pedal 201 by the driver. The stroke sensor 500 functions as brake operation amount detection means for detecting the brake operation amount or operation amount measurement means (operation amount detection device) for measuring the brake operation amount. The pedal stroke to be detected may be a stroke of the input rod 202 connected to the master cylinder 204. The reservoir tank 203 stores brake fluid (working fluid). The reservoir tank 203 is provided on the master cylinder 204, and can supply the brake fluid to the master cylinder 204. The master cylinder 204 internally generates a pressure (master cylinder pressure) of the brake fluid in accordance with the brake operation. The master cylinder 204 is connected to wheel cylinders (brake cylinders) 206 of the front wheels 10 through brake pipes 207. The brake pipe 207 is arranged for each of the systems (for the left front wheel 10L and the right front wheel 10R). The wheel cylinder 206 is a caliper of a hydraulic type, and propels a piston through use of the hydraulic pressure supplied through the brake pipe 207. As a result, brake pads serving as braking members are pressed against a brake rotor, to thereby apply a frictional braking force to the front wheel 10.

The hydraulic brake mechanism 30 is a hydraulic pressure control unit configured to use the hydraulic pressure so as to be able to apply the braking force to the front wheel 10. The hydraulic brake mechanism 30 is provided in an intermediate portion of the brake pipe 207. The hydraulic brake mechanism 30 is connected to the reservoir tank 203 through the brake pipe 208. A housing of the hydraulic brake mechanism 30 internally includes a plurality of fluid passages, and accommodates a plurality of valves, a pump, and a plurality of hydraulic pressure sensors 50. Each valve can control opening/closing of the fluid passage. Some of the valves are solenoid valves, and are driven by solenoids 303. The pump is, for example, a plunger pump, and is able to supply the hydraulic pressure by discharging the brake fluid to the fluid passage. The pump is driven by a motor (electric motor) 302. The motor 302 is, for example, a brush DC motor. The plurality of fluid passages form a hydraulic circuit. The hydraulic brake mechanism 30 actuates the pump and the valves so as to be able to supply suitable hydraulic pressures to the wheel cylinders 206 of the front wheels 10L and 10R, and be able to independently control the hydraulic pressures for the front wheels 10L and 10R. For example, the pump and an adjustment valve are actuated so as to generate an original pressure, and opening/closing of each of a pressure boosting valve and a pressure reducing valve corresponding to each wheel cylinder 206 is controlled in this state so as to be able to supply hydraulic pressures different from one another to the respective wheel cylinders 206. The motor 302 may be a three-phase blushless DC motor.

The plurality of hydraulic pressure sensors 50 include system pressure sensors and a master cylinder pressure sensor 501. The system pressure sensors include a sensor capable of detecting a pressure in a fluid passage communicating to the wheel cylinder 206 of the left front wheel 10L and a sensor capable of detecting a pressure in a fluid passage communicating to the wheel cylinder 206 of the right front wheel 10R. The master cylinder pressure sensor 501 can detect a pressure (master cylinder pressure) in a fluid passage communicating to a pressure chamber of the master cylinder 204. The master cylinder pressure corresponds to a force (pedal depression force) of depressing the brake pedal 201 or the amount (pedal stroke) of depressing the brake pedal 201. The pedal depression force and the pedal stroke correspond to the brake operation amount. The master cylinder pressure sensor 501 functions as the brake operation amount detection means or the operation amount measurement means (operation amount detection device). The pedal depression force to be detected may be a depression force directly acting on the brake pedal 201 or an axial force of the input rod 202.

The front ECU 40 is a first control device, which is provided in the housing of the hydraulic brake mechanism 30, and is capable of controlling the hydraulic brake mechanism 30. The front ECU 40 includes a CPU, a drive circuit, and an interface circuit. The drive circuit includes a solenoid drive circuit and a motor drive circuit. The interface circuit receives inputs of signals from the stroke sensor 500, the hydraulic pressure sensors 50, and other sensors and signals from other ECUs. The CPU, the drive circuit, the interface circuit, and the like function as a first control circuit capable of controlling the hydraulic brake mechanism 30, and control the motor 302 and the solenoids 303 based on the input signals so as to be able to control each hydraulic pressure supplied to the wheel cylinder 206 of each of the front wheels 10L and 10R.

The stroke simulator 205 is provided in the housing of the hydraulic brake mechanism 30, and can communicate to the pressure chamber of the master cylinder 204. The stroke simulator 205 is actuated by accommodating the brake fluid flowing out from the pressure chamber of the master cylinder 204, and is capable of generating a reaction force against the brake operation. The front ECU 40 allows, for example, the stroke simulator 205 to communicate to the pressure chamber of the master cylinder 204 under a state in which the communication between the master cylinder 204 and the wheel cylinders 206 is shut off, to thereby generate a reaction force in accordance with the brake operation.

When the hydraulic control cannot be executed, for example, at the time of a failure of the front ECU 40 or a failure of an actuator (the motor 302 or the like), the hydraulic brake mechanism 30 shuts off the communication between the master cylinder 204 and the stroke simulator 205 in the hydraulic circuit, and allows the side of the master cylinder 204 and the side of the wheel cylinders 206 to communicate to each other in the hydraulic circuit. As a result, the master cylinder pressure can be supplied to each wheel cylinder 206, and braking forces can thus be applied to the front wheels 10 through the brake operation.

A description is now given of a rear wheel brake device 21. The rear wheel brake device 21 includes electric brake devices 210, a rear ECU 41, and a parking brake switch 56. The electric brake device 210 is provided for each of the left and right rear wheels 11L and 11R. The electric brake device 210 includes an electric brake mechanism 31 and a sub ECU 42.

Figure 2:
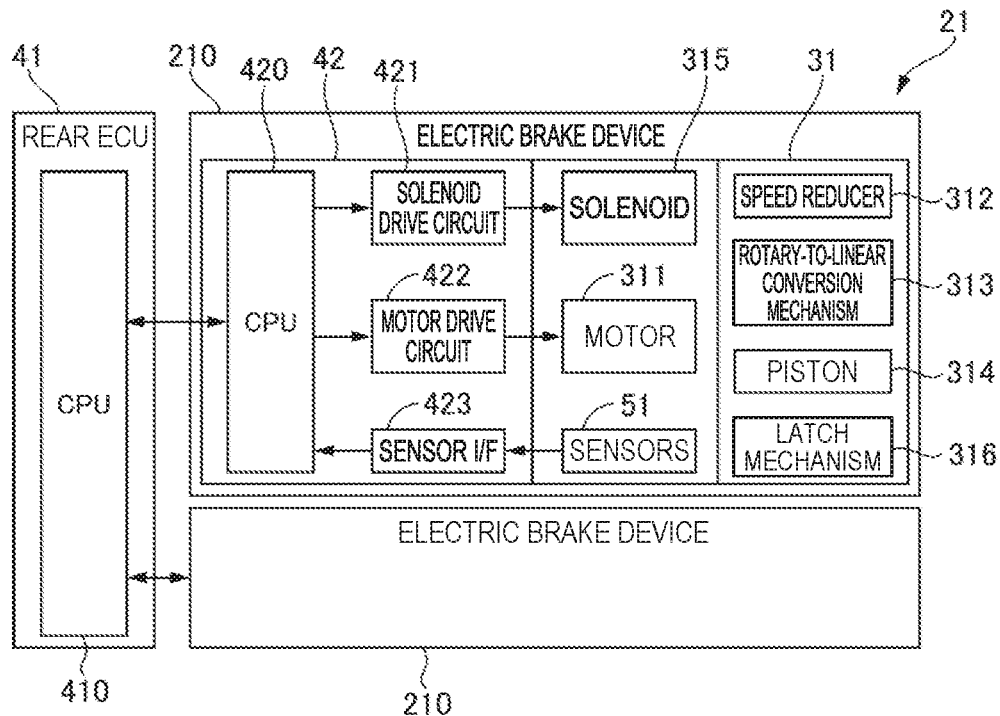
FIG. 2 is diagram for illustrating a configuration of a control system for a rear wheel brake device in the first embodiment.

The electric brake mechanism 31 is an electric caliper, and propels braking members through use of an electric motor. That is, the electric brake mechanism 31 presses brake pads serving as the braking members against a brake rotor, to thereby be able to apply a frictional braking force to the rear wheel 11. Specifically, as illustrated in FIG. 1 and FIG. 2, the electric brake mechanism 31 includes a motor 311 as the electric motor, a speed reducer 312, a rotary-to-linear conversion mechanism 313, a piston 314, a solenoid 315, a latch mechanism 316, and a plurality of sensors 51. The motor 311 is, for example, a three-phase DC brushless motor, and includes a resolver capable of detecting a rotational angle of a rotor of the motor 311. The speed reducer 312 is, for example, a differential gear speed reducing mechanism, and reduces an output rotation of the motor 311 to transmit the reduced output rotation to the rotary-to-linear conversion mechanism 313. The rotary-to-linear conversion mechanism 313 is, for example, a ball screw mechanism, and converts the rotational motion of the motor 311 (speed reducer 312) to a linear motion to transmit the linear motion to the piston 314. The piston 314 can be brought into abutment with a rear surface of the brake pad. A force of pressing the brake pad through the propulsion by the piston 314 is hereinafter referred to as "piston thrust". The piston thrust corresponds to the braking force for the rear wheel 11. The latch mechanism 316 engages with latches provided on the rotor of the motor 311 even when the motor 311 is in a de-energized state, to thereby be able to hold the piston thrust. The solenoid 315 can drive the latch mechanism 316. The solenoid 315 and the latch mechanism 316 function as a parking brake mechanism. The plurality of sensors 51 include a position sensor 511, a current sensor 512, and a thrust sensor 513. The position sensor 511 can detect a position of the piston 314. The current sensor 512 can detect a current of the motor 311. The thrust sensor 513 can detect the piston thrust. The current of the motor 311 corresponds to the piston thrust. Therefore, the thrust sensor 513 may be omitted, and the piston thrust may be estimated based on the current of the motor 311. More specifically, an electric brake mechanism disclosed in JP 2006-105170 A or JP 2006-183809 A may be employed as the electric brake mechanism 31. The electric brake mechanisms 31 of the rear wheels 11L and 11R actuate the motors 311 independently of one another, to thereby be able to generate the piston thrusts, and actuate the latch mechanisms 316, to thereby be able to hold the piston thrusts.

Referring to FIG. 2, a description is now given of a configuration of the control system for the rear wheel brake device 21. The number of the rear ECUs 41 is one. A case (housing) of the rear ECU 41 may be independent of or common to the case of the front ECU 40. When the case is common, a board of the rear ECU 41 may be independent of or common to a board of the front ECU 40. The sub ECU 42 is provided in a housing of each electric brake mechanism 31. The rear ECU 41 and the sub ECU 42 are connected to one another so as to be able to communicate to one another via a dedicated communication line (signal line) 612. The rear ECU 41 and the sub ECUs 42 are a second control device capable of controlling the electric brake mechanism 31. The rear ECU 41 includes an upper CPU 410 and an interface circuit. The interface circuit receives inputs of signals from the parking brake switch 56 and other sensors and signals from other ECUs. The sub ECU 42 includes a lower CPU 420, a drive circuit, and an interface circuit. The drive circuit includes a solenoid drive circuit 421 and a motor drive circuit 422. Wires to the solenoid 315 are connected to the solenoid drive circuit 421. Wires to the motor 311 are connected to the motor drive circuit 422. The interface circuit includes an interface circuit 423 to which signal lines of the sensors are connected, and receives an input of signals from the CPU 410. The CPU 420 controls the motor 311 and the solenoid 315 (of the electric brake mechanism 31 for which this sub ECU 42 is provided) based on signals input from the CPU 410, the sensors 51, and the like through the interface circuit. As a result, the piston thrust and the actuation of the latch mechanism 316 (of this electric brake mechanism 31) can be controlled. For example, the CPU 420 calculates a target current value of the motor 311 in accordance with a braking force command for the rear wheel 11 input from the CPU 410, and calculates a duty ratio in accordance with the target current value. The CPU 420 outputs a command signal indicating the duty ratio to the motor drive circuit 422. Moreover, the CPU 420 detects or estimates a real braking force (actual braking force) of the rear wheel 11 based on the signals from the sensors 51, and adds a control signal corresponding to a difference between the braking force command and the actual braking force to the command signal. The motor drive circuit 422 supplies electric power to the motor 311 in accordance with the command signal after the addition. As a result, such a piston thrust as to allow the actual braking force of the rear wheel 11 to approach the braking force command is generated. In this manner, the CPU 410, the CPUs 420, the drive circuits 421 and 422, the interface circuits 423, and the like function as a second control circuit capable of controlling the electric brake mechanisms 31.

The interface circuits of the ECU 40 to the ECU 42 may be software inside the CPUs.

As illustrated in FIG. 1, a plurality of sensors (detection devices) included in the vehicle are connected to the front ECU 40 and the rear ECU 41. The plurality of sensors include wheel speed sensors 52, an acceleration sensor 53, a yaw rate sensor 54, a load position distribution sensor 57, and a steering angle sensor. The wheel speed sensor 52 is provided for each of the wheels 10L, 10R, 11L, and 11R, and detects a rotational angular velocity (wheel speed) of each of the wheels 10L, 10R, 11L, and 11R. The wheel speed sensor 52 functions as a wheel speed detection device or wheel speed measurement means for measuring the wheel speed. The acceleration sensor 53 detects an acceleration (front-rear G) in a longitudinal (front-rear) direction of the vehicle and an acceleration (lateral G) in a lateral (left-right) direction of the vehicle. The acceleration sensor 53 functions as an acceleration detection device or acceleration measurement means for measuring the acceleration of the vehicle. The acceleration herein includes a deceleration. The yaw rate sensor 54 detects a yaw rate of the vehicle. The yaw rate sensor 54 functions as a yaw rate detection device or yaw rate measurement means for measuring the yaw rate of the vehicle. The sensors 53 and 54 are integrated as a composite sensor 55.

The load position distribution sensor 57 is formed of, for example, seat belt sensors each configured to detect whether or not a vehicle occupant wears a seat belt, seat sensors each configured to detect whether or not a vehicle occupant is seated on a seat, seat load sensors each configured to detect whether or not a vehicle occupant is seated on a seat and detect a mass of the vehicle occupant as a load, or an interior-pointed camera capable of determining the mass or the weight of a vehicle occupant as the load.

A steering angle sensor detects a steering angle of the driver.

The front ECU 40 and the rear ECU 41 are connected to one another so as to be able to communicate to/from one another via a dedicated communication line (signal line) 611. The front ECU 40 can transmit acquired or received (hereinafter simply referred to as "acquired") sensor signals and calculated command signals to the rear ECU 41 through use of communication. Moreover, the rear ECU 41 can transmit acquired sensor signals and calculated command signals to the front ECU 40 through use of communication. Moreover, the front ECU 40 and the rear ECU 41 are connected to another ECU 43 (for example, an ECU of an advanced driver assistance system (ADAS) taking charge of automatic brake control and the like) for communication through an in-vehicle communication network or controller area network (CAN) 610. The ECUs 40 and 41 can acquire a signal of the steering angle sensor (steering angle information) and an automatic brake command from the ECU 43.

The master cylinder pressure sensor 501 is directly (without intervention of other ECU) connected to the front ECU 40. The rear ECU 41 does not exist on a transmission path of a signal of the master cylinder pressure sensor 501. The front ECU 40 acquires pedal depression force information without intervention of the rear ECU 41. Moreover, signal lines of the composite sensor 55 (a signal line 63 of the acceleration sensor 53 and a signal line 64 of the yaw rate sensor 54) are directly connected to the front ECU 40. The rear ECU 41 does not exist on transmission paths of signals of the yaw rate sensor 54 and the acceleration sensor 53. The front ECU 40 acquires yaw rate information on the vehicle and acceleration information on the vehicle without intervention of the rear ECU 41. Moreover, a signal line 62 of the wheel speed sensor 52 is not connected to the front ECU 40.

Further, the load position distribution sensor 57 is connected to the front ECU 40, and the front ECU 40 thus acquires load position distribution information.

A signal line 60 of the stroke sensor 500 is directly connected to the rear ECU 41 (interface circuit). The front ECU 40 does not exist on a transmission path of a signal of the stroke sensor 500. The rear ECU 41 acquires pedal stroke information without intervention of the front ECU 40. Moreover, the signal line 62 of the wheel speed sensor 52 is directly connected to the rear ECU 41 (interface circuit). The front ECU 40 does not exist on a transmission path of a signal of the wheel speed sensor 52. The rear ECU 41 directly acquires wheel speed information on the wheels 10L, 10R, 11L, and 11R without intervention of the front ECU 40. Moreover, the signal line 63 of the acceleration sensor 53 and the signal line 64 of the yaw rate sensor 54 are not connected to the rear ECU 41. The rear ECU 41 acquires the yaw rate information on the vehicle and the acceleration information on the vehicle through the front ECU 40.

The front ECU 40 and the rear ECU 41 can control the hydraulic brake mechanism 30 and the electric brake mechanisms 31, respectively, based on the acquired signals. The ECUs 40 and 41 execute braking force control for the front wheels 10 and the rear wheels 11, respectively, to thereby be able to function as a control device for the vehicle. That is, the front ECU 40 functions as a hydraulic brake control device configured to control the braking forces for the front wheels 10. The rear ECU 41 and the sub ECUs 42 function as an electric brake control device configured to control the braking forces for the rear wheels 11. As a result, the ECUs 40 to 42 can execute various types of brake control. The brake control includes, for example, normal brake control, antilock brake control or anti-lock braking system (ABS), traction control, brake control for motion control for a vehicle, regenerative cooperative brake control, automatic brake control, parking brake control, and hill start aid control.

The normal brake control generates such braking forces as to achieve a desired characteristic between the brake operation amount and a vehicle deceleration requested by the driver. The ABS is brake control of suppressing lock of a wheel caused by braking. When the wheel speed (the signal of the wheel speed sensor 52) of a certain wheel significantly decreases with respect to an estimated vehicle-body speed, it is determined that this wheel is locked, and a braking force for this wheel is reduced. The vehicle-body speed can be estimated by calculating an average value of the signals of the wheel speed sensors 52 for the four wheels 10L, 10R, 11L, and 11R, or selecting the maximum value of the signals of the wheel speed sensors 52 for the four wheels 10L, 10R, 11L, and 11R. The traction control is brake control of suppressing drive slips of wheels. The motion control for the vehicle includes control for stabilizing a vehicle behavior, for example, electronic stability control (ESC). When an actual yaw rate significantly deviates from a yaw rate (target yaw rate) of the vehicle expected from the current acceleration and deceleration and the current steering angle (the signal of the steering angle sensor) of the vehicle, the ESC changes the braking forces of the left and right wheels so that the actual yaw rate approaches the target yaw rate. The signal of the brake operation amount from the stroke sensor 500 or the like or the signal of the operation amount of the accelerator pedal can be used as the acceleration and the deceleration of the vehicle. The signal of the yaw rate sensor 54 can be used as the actual yaw rate, or a value estimated from any one of or a plurality of the signal (lateral acceleration) of the acceleration sensor 53, the signals of the wheel speed sensors 52, and the signal of the steering angle sensor may be used. The regenerative cooperative brake control generates such a braking force as to allow a sum of the braking force and a regenerative braking force to satisfy the vehicle deceleration requested by the driver. The automatic brake control is brake control required to achieve functions such as preceding vehicle following (inter-vehicle distance keeping) and collision prevention. The hill start aid control is brake control of maintaining stopping of the vehicle during hill start so as to prevent the vehicle from rolling backward.

Figure 3:
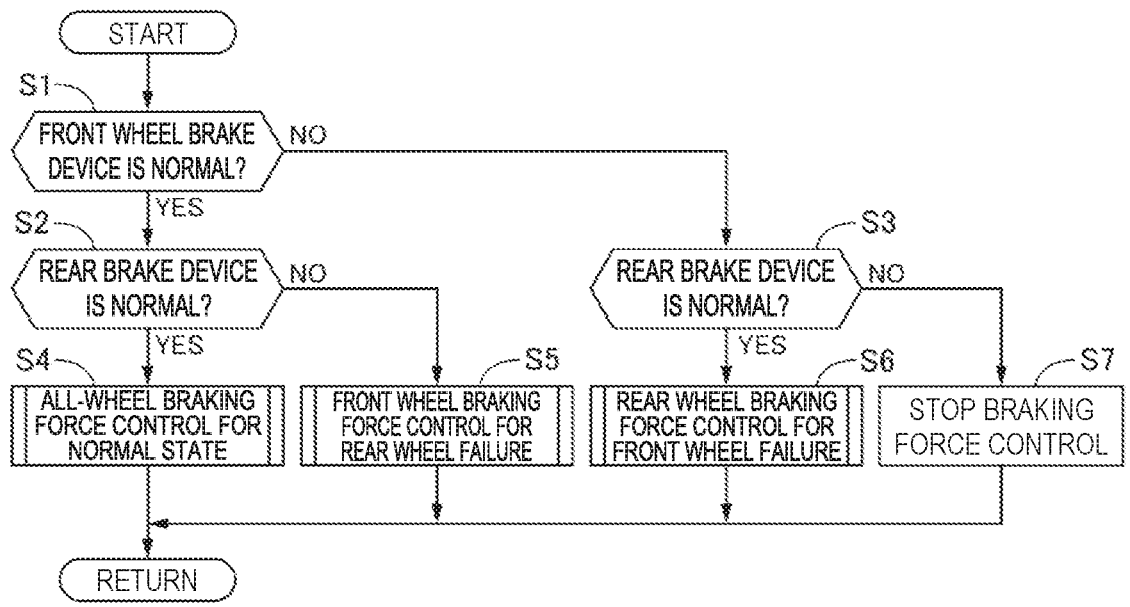
FIG. 3 is a flowchart for illustrating a flow of entire braking force control in the first embodiment.
Figure 4:
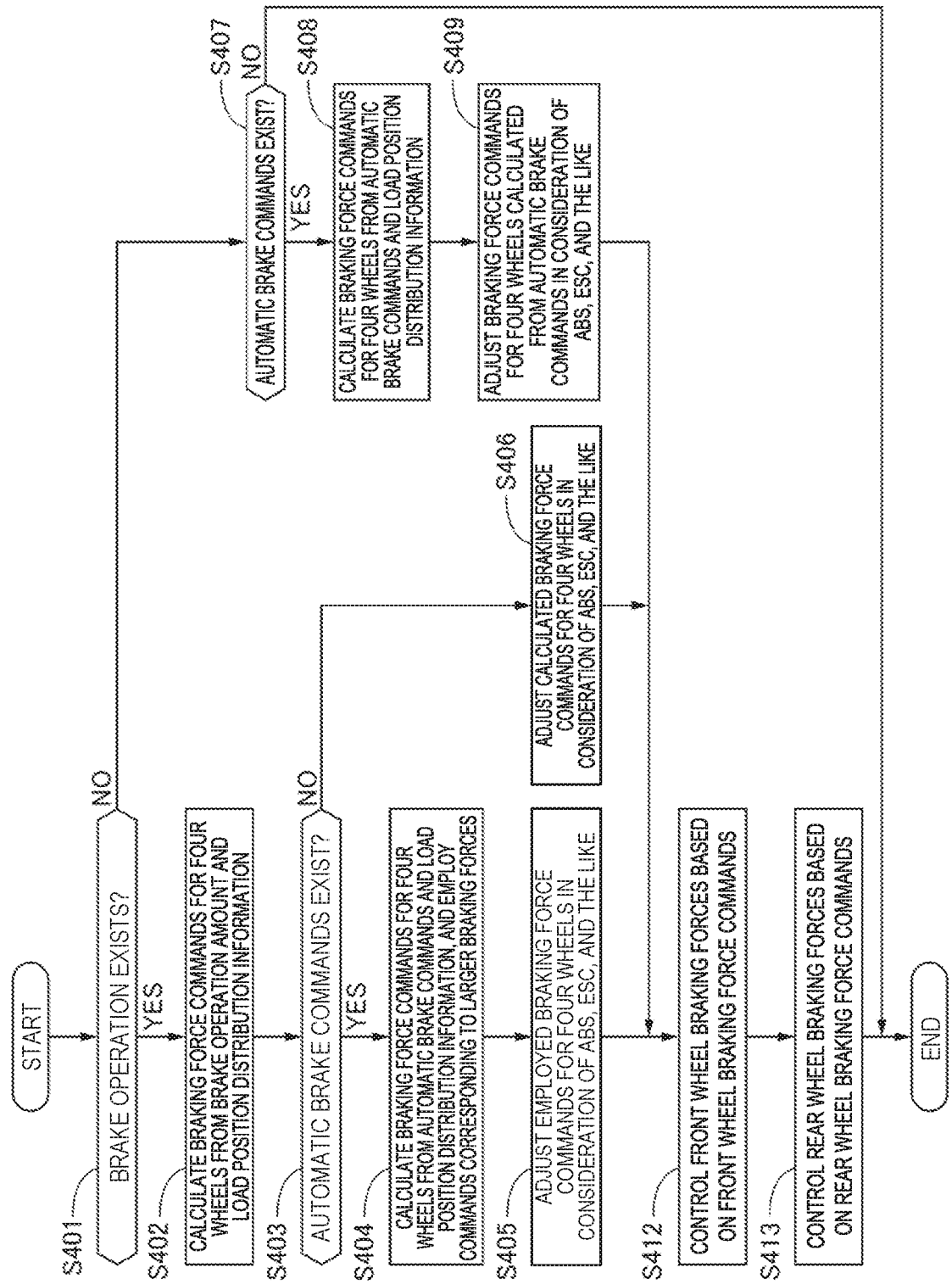
FIG. 4 is a flowchart for illustrating a flow of all-wheel braking force control in a normal state in the first embodiment.

Referring to FIG. 3 and FIG. 4, a description is now given of a flow of the braking force control to be executed by the front ECU 40 and the rear ECU 41. In FIG. 3, there is illustrated a flow of the entire braking force control to be executed by the front ECU 40 and the rear ECU 41 as a whole (for example, in cooperation with each other). This control is repeatedly executed at predetermined cycles.

In Step S1 to Step S3, it is determined whether or not a failure (abnormality) occurs in the front wheel brake device 20 and the rear wheel brake device 21. The front ECU 40 can determine failures of the front wheel brake device 20 (the front ECU 40 and the hydraulic brake mechanism 30) and the rear wheel brake device 21 (the rear ECU 41 and the electric brake devices 210). The same applies to the rear ECU 41. There are various failure states of each of the brake devices 20 and 21 depending on a portion to which a failure is occurring. For example, there are a case in which only one wheel out of the left and right wheels can be controlled, and a case in which none of the left wheel and the right wheel can be controlled, but functions such as the acquisition of the sensor information and an exchange of information through the communication are operable. The ECUs 40 and 41 out of the components of the respective brake devices 20 and 21 achieve functions such as the driving of the actuators, the acquisition of the sensor information, and the communication to/from other ECUs in the respective brake devices 20 and 21 for braking force control. Therefore, when an abnormality occurs in the ECUs 40 and 41, none of those functions can be executed. Thus, for the sake of simple description, it is herein assumed that, as a failed state of the brake devices 20 and 21, an abnormality occurs in the ECUs 40 and 41.

In Step S1, it is determined whether or not the front wheel brake device 20 is normal. When the front wheel brake device 20 is normal, the processing proceeds to Step S2. When the front wheel brake device 20 is in a failed state, the processing proceeds to Step S3. In Step S2, it is determined whether or not the rear wheel brake device 21 is normal. When the rear wheel brake device 21 is normal, the processing proceeds to Step S4. When the rear wheel brake device 21 is in a failed state, the processing proceeds to Step S5. In Step S3, it is determined whether or not the rear wheel brake device 21 is normal. When the rear wheel brake device 21 is normal, the processing proceeds to Step S6. When the rear wheel brake device 21 is in a failed state, the processing proceeds to Step S7. In Step S4, all-wheel braking force control for a normal state is executed. In Step S5, front-wheel braking force control for a rear wheel failure is executed. In Step S6, rear-wheel braking force control for a front wheel failure is executed. In Step S7, the braking force control for the front and rear wheels is stopped.

FIG. 4 is a flowchart for illustrating a flow of the all-wheel braking force control (Step S4 of FIG. 3) for the normal state, which the front ECU 40 and the rear ECU 41 serving as a braking force distribution device execute as a whole. This control is repeatedly executed at predetermined cycles.

Processing of Step S401 to Step 409 may be executed mainly by any one of the front ECU 40 and the rear ECU 41.

In Step S401, it is determined whether or not a brake operation exists. For example, it is determined whether or not a brake operation exists based on whether or not the brake operation amount exceeds a predetermined value. When a brake operation exists, the processing proceeds to Step S402. When a brake operation does not exist, the processing proceeds to Step S407. In Step S402, a command for a braking force to be achieved for each of the four wheels 10L, 10R, 11L, and 11R is calculated based on the detected brake operation amount and the load position distribution information. Then, the processing proceeds to Step S403. In Step S402, for example, a command for the braking force for each of the four wheels 10L, 10R, 11L, and 11R that follows a characteristic in which, for example, the braking force monotonically increases as the brake operation amount increases, and is corrected in accordance with the load position distribution information is calculated. This command is indicated by, for example, the deceleration of the vehicle or a braking torque. Those physical quantities are in a proportional relationship with the hydraulic pressures achieved by the front wheel brake device 20 and the thrusts achieved by the rear wheel brake device 21. Thus, those hydraulic pressures and thrusts may directly be used as the commands.

The calculation of the braking force commands is described in detail later.

In Step S403, it is determined whether or not automatic brake commands exist. When the commands exist, the processing proceeds to Step S404. When the commands do not exist, the processing proceeds to Step S406. The state in which the automatic brake commands exist means a state in which commands for automatically executing the braking exist. Specifically, for example, the commands for automatically executing the braking exist in a case in which commands for the automatic brake control are transmitted from the another ECU 43, and a case in which it is determined that a condition for operating the hill start aid control is satisfied based on the signals of the wheel speed sensors 52, the signal of the acceleration sensor 53, and the like. In Step S404, the commands for the braking forces to be achieved for the respective four wheels 10L, 10R, 11L, and 11R are calculated based on the automatic brake commands and the load position distribution information, and each of the automatic brake commands and each of the commands calculated in Step 402 are compared with one another, and larger ones are employed as the braking force commands. Then, the processing proceeds to Step S405.

In Step S405, braking forces in which functions such as the ABS and ESC are taken into consideration are adjusted among the four wheels 10L, 10R, 11L, and 11R in order to achieve the calculated braking force commands. As a result, braking commands for the respective wheel 10L, 10R, 11L, and 11R for achieving the various types of brake control are obtained. For example, the signals of the wheel speed sensors 52 for the front and rear wheels 10L, 10R, 11L, and 11R are used so as to estimate the vehicle-body speed. The braking force distribution among the four wheels 10L, 10R, 11L, and 11R is adjusted so as to suppress the lock of the wheels based on the vehicle-body speed. Moreover, any one of or a plurality of signals of the yaw rate sensor 54, the acceleration sensor 53, the wheel speed sensors 52, and the steering angle sensor are used so as to detect or estimate the actual yaw rate. The braking force distribution among the four wheels 10L, 10R, 11L, and 11R is adjusted so as to maintain a target yaw rate based on the actual yaw rate.

Then, the processing proceeds to Step S412. In Step S406, the adjustment of the braking force distribution among the four wheels 10L, 10R, 11L, and 11R for achieving the calculated braking force commands is executed as in Step S405. Then, the processing proceeds to Step S412.

In Step S407, it is determined whether or not the automatic brake commands exist as in Step S403. When the commands exist, the processing proceeds to Step S408. When the commands do not exist, this control is finished. In Step S408, a command for a braking force to be achieved for each of the four wheels 10L, 10R, 11L, and 11R of the vehicle is calculated based on the automatic brake commands and the load position distribution information. Then, the processing proceeds to Step S409. In Step S409, the adjustment in which the functions such as the ABS and the ESC of the braking force distribution among the four wheels 10L, 10R, 11L, and 11R for achieving the calculated braking force commands are taken into consideration is executed as in Step S405. Then, the processing proceeds to Step S412.

In Step S412, the front ECU 40 controls the braking forces for the front wheels 10L and 10R based on the braking force commands for the front wheels 10L and 10R out of the distributed braking force commands for the respective wheels 10L, 10R, 11L, and 11R. Then, the processing proceeds to Step S413. In Step S412, the front ECU 40 drives the actuators (the motor 302 and the solenoids 303) while referring to the signals of the hydraulic pressure sensors 50 so that the hydraulic pressures in the wheel cylinders 206 generated by the hydraulic brake mechanism 30 match results obtained by converting the braking force commands for the front wheels 10L and 10R to hydraulic pressure values. In Step S413, the rear ECU 41 and the sub ECUs 42 control the braking forces for the rear wheels 11L and 11R based on the braking force commands for the rear wheels 11L and 11R out of the distributed braking force commands for the respective wheels 10L, 10R, 11L, and 11R. Then, this control is finished. In Step S413, the rear ECU 41 and the sub ECUs 42 drive the motors 311 while referring to the signals of the current sensors 512 and the thrust sensors 513 so that the piston thrusts generated by the electric brake mechanisms 31 match results obtained by converting the braking force commands for the rear wheels 11L and 11R to piston thrust values.

Figure 5:
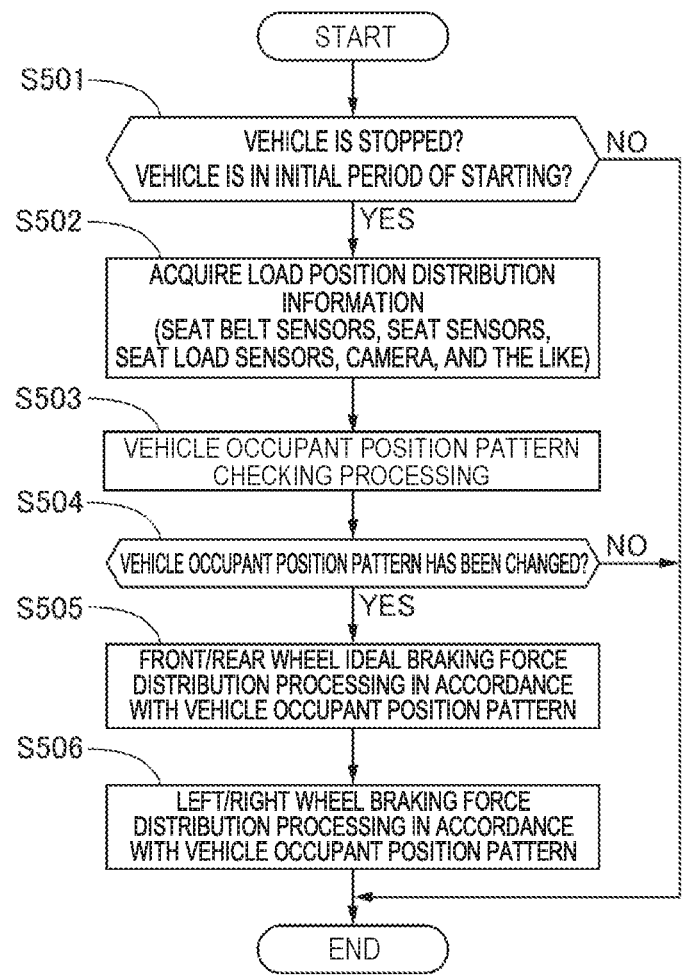
FIG. 5 is a flowchart for illustrating a flow of four-wheel braking force distribution correction control in the first embodiment.

In FIG. 5, there is illustrated a flow of the four-wheel braking force distribution correction control (Step S402 of FIG. 4) in the first embodiment to be executed by the front ECU 40 serving as the braking force distribution device. This control is repeatedly executed at predetermined cycles.

Moreover, the front ECU 40 executes the four-wheel braking force distribution correction control as the braking force commands, and transmits the braking force command for the rear wheels, which is a calculation result, to the rear ECU 41.

The rear ECU 41 may execute the four-wheel braking force distribution correction control as the braking force commands.

When the routine is started, it is determined in Step S501 whether or not the vehicle is stopped or is in an initial period of starting. When the vehicle is stopped or is in the initial period of starting, the processing proceeds to Step S502. When the vehicle is not stopped or is not in the initial period of starting, this control is finished.

The determination as to whether or not the vehicle is stopped is executed based on vehicle speed information calculated based on the wheel speed sensors 52 or the vehicle-body speed sensor.

Moreover, the determination as to whether or not the vehicle is in the initial period of starting is made based on the vehicle speed information calculated based on the wheel speed sensors 52 or the vehicle-body speed sensor, and is made by a timer based on whether or not an elapsed period since a change of the vehicle speed from 0 to a speed higher than 0 is within a predetermined period (several tens of seconds).

That is, it is only required to be able to acquire the load position distribution information before an initial braking state in order to handle the first braking state after the start of the travel.

In Step S502, the load position distribution information is acquired from the load position distribution sensor 57 formed of, for example, the seat belt sensors each configured to detect whether or not a vehicle occupant wears the seat belt, the seat sensors each configured to detect whether or not a vehicle occupant is seated on the seat, the seat load sensors each configured to detect whether or not a vehicle occupant is seated on a seat and detect the mass of the vehicle occupant as the load, or the interior-pointed camera capable of determining the mass or the weight of a vehicle occupant as the load.

In Step S503, it is checked to which pattern of vehicle occupant position patterns of a five-vehicle occupant vehicle shown in FIG. 6 the load position distribution information corresponds.

In Step S504, it is determined whether or not the vehicle occupant position pattern is to be corrected from that in the previous execution of the routine. When a correction is to be made, the processing proceeds to Step S505. When a correction is not to be made, this control is finished. That is, braking force commands directed to the four wheels 10L, 10R, 11L, and 11R from an ideal braking force distribution line calculated in the previous routine are used.

Figure 8:
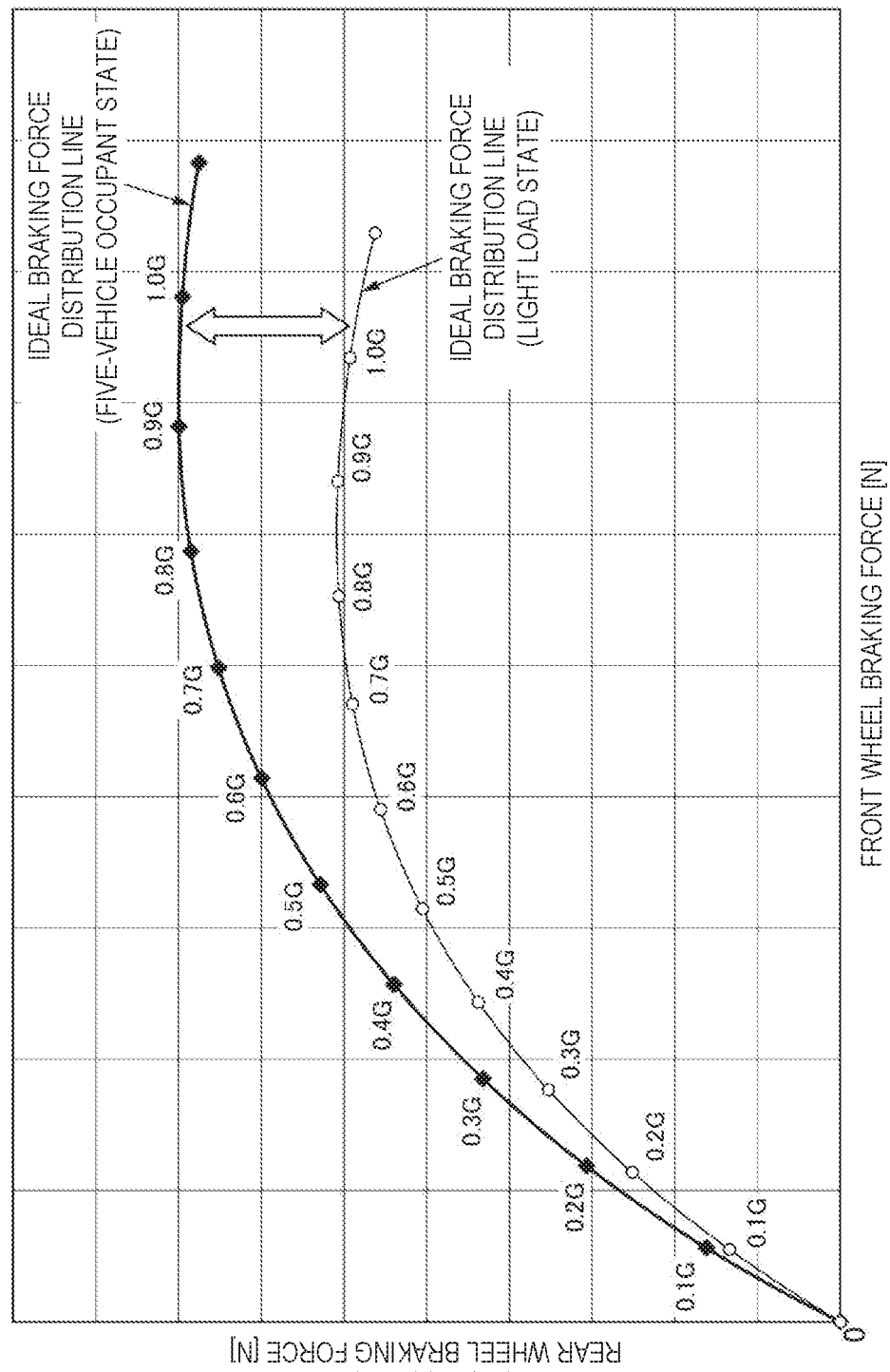
FIG. 8 is a graph for showing ideal braking force distribution lines in the first embodiment.

In Step S505, a front wheel increased mass (load) set in advance, which is shown in FIG. 7, is acquired in accordance with the vehicle occupant position pattern of FIG. 6, and the ideal braking force distribution line is calculated for each target deceleration based on the detected brake operation amount shown in FIG. 8. Then, the processing proceeds to Step S506.

Set values shown in FIG. 7 are an example, and are set for each vehicle occupant position pattern.

In Step S506, processing of acquiring a right front wheel distribution ratio and a right rear wheel distribution ratio set in advance of FIG. 7 in accordance with the vehicle occupant position pattern of FIG. 6, and assigning the braking forces distributed to the front wheels and the rear wheels, which are calculated in Step S505, so as to achieve the respective distribution ratios is executed, to thereby determine the braking forces for the four wheels 10L, 10R, 11L, and 11R for each target deceleration. Then, this control is finished.

The processing of Step S404 and Step S408 of FIG. 4 also follows the same flow.

Thereafter, the braking force commands directed to the four wheels 10L, 10R, 11L, and 11R are acquired in accordance with a target deceleration corresponding to the brake operation amount or the automatic brake commands from the calculated ideal braking force distribution line in a braking state that has occurred, to thereby execute the braking force control.

A detailed description is now given of a calculation method for the braking force command directed to each wheel in the front ECU 40 serving as the braking force distribution device.

For example, as details of calculation to be executed during the stop of the vehicle, such an ideal braking force distribution for each target deceleration as shown in FIG. 8 is calculated from the number of vehicle occupants (mass of the vehicle occupants, which is equal to load) and the vehicle occupant positions, which is obtained from the acquired information on whether the vehicle occupant wears the seat belt from the seat belt sensors serving as the load position distribution sensors 57, to thereby determine the ideal braking force distribution line for the front and rear wheels.

The thin line of FIG. 8 indicates a case of a light load state (one vehicle occupant) and the thick line of FIG. 8 indicates a five-vehicle occupant state. Then, an ideal braking force distribution line positioned between the thin line and the thick line is calculated in accordance with the vehicle occupant position pattern of FIG. 6 and the set values of FIG. 7.

Moreover, the mass (load) information on the vehicle occupants cannot be acquired from the information on whether the vehicle occupant wears the seat belt from the seat belt sensors serving as the load position distribution sensors 57, and a mass (load) per vehicle occupant is thus set in advance.

The information on whether the vehicle occupant wears the seat belt from the seat belt sensors may be information on whether the vehicle occupant is seated on the seat from the seat sensors.

Moreover, the information on whether the vehicle occupant wears the seat belt and the information on whether the vehicle occupant is seated on the seat may be used in combination to execute processing of determining that the mass (load) is equal to or less than a mass (load) to which the seat sensor can react, when the seat belt information indicates "wearing" and the seat information indicates "not seated", to thereby reduce the set mass (load) per vehicle occupant.

Moreover, an interior-pointed camera or a seat load sensor capable of determining the position and the weight of the vehicle occupant may be used as the load position distribution sensor 57, and the mass of the vehicle occupant may be changed depending on a result (such as an adult, a child, or baggage) of determination by the camera, or a value of the seat load sensor.

In order to determine the ideal braking force distribution line, the braking force for the front wheels is calculated in accordance with "target deceleration×(front wheel mass+target deceleration×vehicle mass×height of gravitational center/wheel base)×9.81", and the braking force for the rear wheels is calculated in accordance with "target deceleration×(rear wheel mass-target deceleration×vehicle mass×height of gravitational center/wheel base)×9.81".

In this case, "front wheel mass", "rear wheel mass", "vehicle mass", and "height of gravitational center" are given as terms that change in accordance with the number of vehicle occupants and the positions of the vehicle occupants.

Regarding "front wheel mass" and "rear wheel mass", the set values shown in FIG. 7 as an example are set in advance for each pattern of the number of vehicle occupants (mass=load) and the pattern of the vehicle occupant positions as shown in FIG. 6, and a front wheel increased mass is added to "front wheel mass" before riding. The set values do not include a rear wheel increased mass, but is obtained by a difference between the vehicle occupant mass set to the subject vehicle occupant positions and the front wheel increased mass. As another method, the masses added to the front and rear wheels may be calculated from an equation of balance of forces.

Regarding "vehicle mass", the vehicle occupant masses at the subject vehicle occupant positions are added to the "vehicle mass" in a vehicle empty state.

Regarding "height of gravitational center", it is assumed that the "height of gravitational center" does not change for the sake of simple calculation, and a value of a height of gravitational center in the vehicle empty state is used.

The values determined by the ideal braking force distribution line are the braking forces for the front wheels and the rear wheels. In order to determine the braking forces for the respective four wheels, the front braking force and the rear braking force are required to be distribute to the left and the right. When the left and right masses are the same, the distribution ratios are 50%. However, the left and right masses change in accordance with the number of vehicle occupants and the positions of the vehicle occupants, and therefore the distribution ratios are determined based on the number of vehicle occupants and the positions of the vehicle occupants. The respective braking forces for the four wheels are then determined.

As a method of determining the left and right distribution ratios, such left and right distribution ratios as shown in FIG. 7 are set in advance for each pattern of the number of vehicle occupants (mass) and the vehicle occupant positions as shown in FIG. 6 in accordance with the number of vehicle occupants (mass) and the vehicle occupant positions. Left distribution ratios do not exist in the set values for the front or for the rear, but can be obtained from a difference of the right distribution ratios from 100%. As another method, the masses added to the left and right wheels may be calculated from an equation of balance of forces, and the ratios may be ratios between masses of the left and right wheels after the addition.

Thereafter, the braking force commands directed to the four wheels 10L, 10R, 11L, and 11R are acquired in accordance with the target deceleration corresponding to the brake operation amount or the automatic brake commands from the calculated ideal braking force distribution line in the braking state that has occurred, to thereby execute the braking force control.

A description is now given of actions and effects of this embodiment.

(1) The load position distribution caused by the vehicle occupants is detected in advance when the vehicle is stopped or is in the initial period of starting, to thereby correct the ideal braking force distribution line.

Thus, the correction amounts during the travel decrease compared with the case without the correction with the vehicle occupant, and influence on a change in deceleration caused by the correction is thus reduced. Moreover, a decrease in the deceleration caused by an increase in mass is suppressed for the same pedal operation, and brake feeling can thus be improved.

(2) The load position distribution detection unit is configured to detect the load position distribution when the vehicle is stopped.

Thus, the braking force distribution to each of the wheels corresponding to the load position distribution can reliably be achieved in the first braking state.

(3) The load position distribution detection unit is configured to detect the position distribution of the load from information obtained by the seatbelt sensor.

Thus, the existing sensors provided in the vehicle can be used, and an increase in cost can consequently be suppressed.

(4) The load position distribution detection unit is configured to detect the load applied to the seat of the vehicle and the position of the load from the information obtained by the seat load sensor.

Thus, the value and the position of the load applied to the seat of the vehicle can be detected, and the load position distribution can accurately be acquired.

(5) The brake device further includes: the hydraulic brake configured to propel the braking member through use of the hydraulic pressure, to thereby apply the braking force on the front wheel side; and the electric brake configured to propel the braking member through use of the electric motor, to thereby apply the braking force on the rear wheel side.

Thus, the front wheels and the rear wheels are controlled independently of one another, and the braking forces for the front wheels and the rear wheels can appropriately be applied. Moreover, the electric brake on the rear wheel side is high in response to the correction during the travel, and the brake feeling can thus further be improved.

(6) The braking force distribution device is configured to correct the braking force distribution between the left wheel and the right wheel based on the detection value obtained by the load position distribution detection unit.

Thus, the decrease in the deceleration due to the increase in the vehicle occupant mass as the load is further suppressed, and the brake feeling can further be improved.

Other Embodiments

The embodiment of the present invention has been described above. However, the specific configuration of the present invention is not limited to the configuration described in the embodiment. A modification in design without departing from the scope of the gist of the invention is also encompassed in the present invention. Further, within a range in which the above-mentioned problems can be at least partially solved or within a range in which the effects are at least partially obtained, a suitable combination or omission of the components recited in the claims and described in the specification is possible.

Other Modes Understandable from Embodiments

A description is now given of other modes understandable from the embodiments described above.

(1) According to one mode of the present invention, there is provided a brake device including: a braking force distribution device configured to set a distribution of a braking force to each wheel of a vehicle or a braking force for each wheel based on a predetermined braking force distribution characteristic; and a load position distribution detection unit configured to detect a position distribution of a load applied to the vehicle when the vehicle is stopped or is in an initial period of starting, and the braking force distribution device is configured to correct the set distribution of the braking force to each wheel or the set braking force for each wheel, based on a detection value obtained by the load position distribution detection unit.

(2) According to another mode of the present invention, in the above-mentioned mode, the braking force distribution device is configured to correct the distribution of the braking force to each wheel or the braking force for each wheel, based on a detection value obtained by the load position distribution detection unit when the vehicle is stopped.

(3) According to still another mode of the present invention, in any one of the above-mentioned modes, the load position distribution detection unit is configured to detect the position distribution of the load from information obtained by a seatbelt sensor.

(4) According to still another mode of the present invention, in any one of the above-mentioned modes, the load position distribution detection unit is configured to detect a load applied to a seat of the vehicle and a position of the load from information obtained by a seat load sensor.

(5) According to still another mode of the present invention, in any one of the above-mentioned modes, the brake device further includes: a hydraulic brake configured to propel a braking member through use of a hydraulic pressure, to thereby apply a braking force on a front wheel side; and an electric brake configured to propel a braking member through use of an electric motor, to thereby apply a braking force on a rear wheel side.

(6) According to still another mode of the present invention, in any one of the above-mentioned modes, the braking force distribution device is configured to correct a braking force distribution between a left wheel and a right wheel, based on the detection value obtained by the load position distribution detection unit.

(7) From another viewpoint, according to one mode of the present invention, there is provided a vehicle control device, which is configured to set a distribution of a braking force to each wheel of a vehicle or a braking force for each wheel based on a predetermined braking force distribution characteristic, the vehicle control device being configured to correct the set distribution of the braking force to each wheel or the set braking force for each wheel, based on a load applied to the vehicle and information on a position of the load.

The present application claims priority from Japanese Patent Application No. 2017-185737 filed on Sep. 27, 2017. The entire disclosure including Specification, Scope of Claims, Drawings, and Abstract of Japanese Patent Application No. 2017-185737 filed on Sep. 27, 2017 is incorporated herein in its entirety by reference.

REFERENCE SIGNS LIST

1 brake device, 10 front wheel (wheel belonging to first group), 11 rear wheel (wheel belonging to second group), 201 brake pedal (brake operation member), 206 wheel cylinder (braking member), 30 hydraulic brake mechanism, 31 electric brake mechanism, 311 motor (electric motor), 314 piston (braking member), 40 front ECU (first control device, other brake control device, first control circuit, vehicle control device, braking force distribution device), 41 rear ECU (second control device, electric brake control device, second control circuit, vehicle control device, braking force distribution device), 410 CPU (calculation device, calculation unit), 500 stroke sensor (operation amount detection device, operation amount measurement means), 52 wheel speed sensor (wheel speed measurement means), 53 acceleration sensor (acceleration measurement means), 54 yaw rate sensor (yaw rate measurement means), 57 load position distribution sensor (load position distribution detection unit), 60 signal line, 611 communication line, 612 communication line, 62 signal line, 63 signal line, 64 signal line

The invention claimed is:

1. A brake device, comprising:
    a braking force distribution device configured to set a distribution of a braking force to a left wheel and a right wheel of a vehicle or a braking force for a left wheel and a right wheel, based on a predetermined braking force distribution characteristic; and
    a load position distribution detection unit configured to obtain a detection value of a load position distribution by detecting a position distribution of a load applied to the vehicle based on only information relating to the number of vehicle occupants and vehicle occupant positions upon determining that the vehicle is in an initial period of starting,
    wherein the braking force distribution device is configured to correct the set distribution of the braking force to the left wheel and the right wheel or the set braking force for the left wheel and the right wheel, based on a predetermined braking force distribution characteristic based on the detection value obtained by the load position distribution detection unit.

2. The brake device according to claim 1, wherein the load position distribution detection unit is configured to detect the position distribution of the load from information obtained by a seatbelt sensor.

3. The brake device according to claim 1, wherein the load position distribution detection unit is configured to detect a load applied to a seat of the vehicle and a position of the load from information obtained by a seat load sensor.

4. The brake device according to claim 1, further comprising:
    a hydraulic brake configured to propel a braking member through use of a hydraulic pressure, to thereby apply a braking force on a front wheel side; and
    an electric brake configured to propel a braking member through use of an electric motor, to thereby apply a braking force on a rear wheel side.

5. The brake device according to claim 1, wherein determining as to whether or not the vehicle is in the initial period of starting is made based on vehicle speed information and is made by a timer based on whether or not an elapsed period since a change of vehicle speed of the vehicle from 0 to a speed higher than 0 is within a predetermined period of several tens of seconds.

* * * * *